Feb. 28, 1939. C. L. FELDTKELLER 2,148,738

BATTERY TERMINAL

Filed Dec. 11, 1937

INVENTOR.

CARL L. FELDTKELLER

BY

ATTORNEY.

Patented Feb. 28, 1939

2,148,738

UNITED STATES PATENT OFFICE 2,148,738

BATTERY TERMINAL

Carl L. Feldtkeller, Milwaukee, Wis., assignor to Solar Corporation, Milwaukee, Wis., a corporation of Delaware Application December 11, 1937, Serial No. 179,309

2 Claims. (Cl. 136—178)

This invention relates to improvements in sealing assemblies for the terminal posts of storage batteries.

In the ordinary battery assembly the terminal posts are extended upwardly through openings provided in the hard rubber cover to expose the upper extremities of the post for connection to the power cables. It is necessary to seal the opening around the posts to prevent acid seepage and consequent corrosion of the posts, and also to brace the posts against mechanical strains and stresses which may be exerted thereon by the pull of the cables and through other causes. For this purpose two methods or assemblies are at present used. They are, first, the lock nut seal in which the posts are threaded and receive lock nuts to be turned down against the cover, and second, the gasket seal in which evenly tapered posts are used and are forced upwardly through soft rubber gaskets located below the cover in recesses provided for their reception. The lock nut seal has the disadvantages of being expensive and of increasing the overall height of the battery by the thickness of the lock nuts. The gasket seal, while being inexpensive and allowing the reduction of the height of the battery, nevertheless has the disadvantages of permitting the post, under strain, to move to and fro within the limits of the clearance of the opening in the cover and of allowing some acid seepage. Also this opening around the post, formed by the clearance necessary in production, is unsightly and gives the impression that the battery is poorly constructed.

With the above facts in mind it is the primary object of my invention to provide a sealing device which is inexpensive, compact and of such nature that the post will be solidly anchored in place in a neat and practical manner. A further object is to provide a sealing device for this purpose which may be readily and inexpensively applied to terminal assemblies of the gasket seal type, in which case it then overcomes all of the states of disadvantages of this seal by securely locking the post in position, and by concealing the clearance opening in the cover. Another object is to provide a seal for this purpose which comprises simply a flanged bushing made of lead and adapted to be pressed on the terminal post after the battery is assembled, the skirt of the bushing then engaging the post with a friction fit and entering the opening in the cover, while the flange comes to rest on the cover to conceal the opening and afford a finished appearance to the assembly.

The foregoing and other more specific objects and advantages of my invention will become apparent in the course of the following specification, reference being had therein to the accompanying drawing in which.

Figure 1:
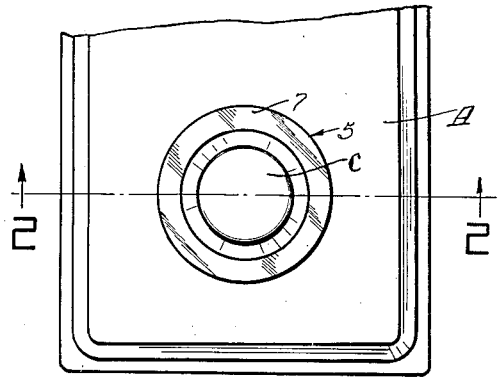
Figure 1 is a plan view of a storage battery terminal post assembly embodying my invention, the cover being shown only fragmentally.
Figure 2:
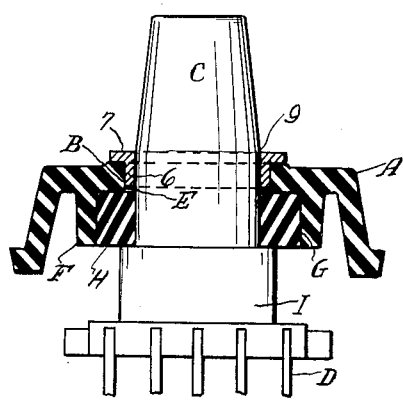
Figure 2 is a vertical cross section along the line 2—2 in Figure 1.
Figure 3:
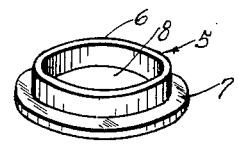
Figure 3 is a perspective view of my improved sealing element alone.

Referring now with more particularity to the drawing the reference character A designates the cover of a conventional form of battery cell or jar and which is made of hard rubber or other suitable insulating material. This cover has an opening B to receive the lead battery terminal post C which is extended upwardly through the opening and at its lower end is secured to the battery grid D. The opening B is of such size that a substantial clearance space E will exist all around the post C as it is passed through the opening. The cover A then has a depended annular flange or wall F formed concentrically with the opening B and which provides a recess or well G for the reception of a soft rubber sealing gasket H. The flange F is of greater diameter than the opening B and the gasket H is forced into the recess G to be retained therein. The post C is then forced upwardly through the gasket until the shoulder I of the post abuts the gasket as shown.

The foregoing is the conventional gasket seal assembly and it will be readily apparent that, due to the resiliency of the soft rubber used in the gasket H, the post C may readily move from side to side under strain. Also it will be evident that some acid seepage will result from this action and also that the opening B is exposed to view from the exterior of the battery. These are the disadvantageous features of the seal as hereinbefore pointed out.

In accordance with my invention I provide a flanged bushing or extruded washer, designated generally at 5, which is made of lead and comprises the tubular or annular skirt 6 and the flange or lip 7 turned outwardly and radially from the intended upper end of the skirt. The bore 8 through the skirt 6 is of such diameter that the skirt may be pressed down over the post C which it will then frictionally and tightly engage. This action is carried out after the battery is assembled and the skirt thus enters the opening B, fitting the same nicely and rigidly bracing the post in said opening. The flange 7 limits the movement of the skirt down over the post as it comes to rest on the cover and in this position it will be apparent that the flange surrounds the post and conceals the opening B from view. In this manner, and by the use of the simple and inexpensive sealing bushing described, I eliminate all of the disadvantages of the gasket seal while still retaining the advantageous features of this type of seal, such as, inexpensive manufacturing and assemblying, and compactness.

Attention may here be directed to the shape of the post C as provided herein and as best suited to the use of my seal. The post is, as usual, of upwardly tapering shape to facilitate the mounting of the cables or connectors (not shown), but this taper begins at a point 9 slightly above the level of the upper surface of the cover A. From that point downwardly then the post has a true cylindrical periphery as shown and for the purpose of providing and facilitating the tight, frictional engagement of the bushing skirt 6 with the post. This skirt is, of course, of such length that it will extend substantially through the cover A but will not interfere with the seating of the gasket H.

I attach considerable importance to the fact that the bushing 5 is made of lead, or other suitable soft metallic substance, since it is due to the use of this material that the bushing is found to meet its intended purpose so well. The lead bushing is thus soft enough that it may be pressed tightly over the post and will engage the same with a metal to metal contact such as to offer the necessary rigid support to the post. The joint between the bushing and the post will furthermore, and in the course of time, grow even more tight due to the normal corrosion and "weathering" effect of the contact between the lead bushing and lead post. Another obvious advantage of the use of lead for the bushing is the fact that it is inexpensive and may be readily formed and manufactured to the required shape for my purpose.

From the foregoing it will be apparent that I have provided a seal which is the ultimate in simplicity but which, nevertheless, solves the long standing problem of sealing the battery post and at the same time offering a rigid support to the post. It is very important that the overall height of the battery be kept at a minimum, especially in batteries for the newer models of automobiles, and in this regard it is noted that my bushing presents the very minimum of projection above the battery cover since the flange 7 need be only thick enough to limit the seating of the bushing and to conceal the opening in the cover. The bushing is also afforded a good bearing surface on the straight cylindrical portion of the post and it is not necessary to "burn" the bushing on the post as is sometimes done.

It is to be understood that I may vary from the specific embodiment of my invention as herein disclosed, provided that such variations fall within the spirit and the scope of the appended claims.

Having thus fully described my invention, what I claim as new and desire to secure by Letters Patent is:

1. In a storage battery, a cover having a circular post opening, a terminal post having a cylindrical portion extending up through said opening and having a reduced tapered portion extending above the cover, said post opening in the cover being of greater diameter than that of the adjacent post portion so as to leave an annular space therebetween, a gasket sealing the underside of the cover opening with respect to the post, and a metallic bushing rigidly connected to the post, said bushing having a depending circular sleeve circumferentially filling said annular space, and having an outwardly projecting flange overlaying the upper cover surface immediately outwardly of the post opening, the inner cylindrical surface of said sleeve being of such diameter, throughout its length, that it will have a tight fit and exert a frictional grip about the cylindrical portion of the post when the bushing is forced downwardly into place thereon.

2. In a storage battery, a cover having a circular post opening and provided below said opening with a circular recess of relatively larger diameter than the opening, a terminal post having a cylindrical portion extending upwardly through said recess and opening, and continuing in a reduced, tapered portion above the level of the cover, a gasket of soft material seated in said recess and encircling the adjacent post portion to form a seal thereabout, and a metallic bushing rigidly connected to the post above the gasket, said bushing comprising a cylindrical sleeve encircling a cylindrical part of the post within and filling the opening, with the diameter of the entire inner surface of the sleeve being such, with respect to the post, that it will form a tight fit with and firmly grip the cylindrical portion of the post, when the bushing is forced downwardly upon the post, and a flange extending outwardly from the upper end of the sleeve to overlie the cover surface adjacent the post opening.

CARL L. FELDTKELLER.